(12) United States Patent
Sulkowski et al.

(10) Patent No.: US 8,332,291 B2
(45) Date of Patent: Dec. 11, 2012

(54) SYSTEM AND METHOD FOR MONITORING MANAGING AND VALUING CREDIT ACCOUNTS

(75) Inventors: Nikolas Sulkowski, New Canaan, CT (US); Leonard Laufer, Scarsdale, NY (US); Nana Banerjee, White Plains, NY (US)

(73) Assignee: Argus Information and Advisory Services, Inc., White Plains, NY (US)

( * ) Notice: Subject to any disclaimer, the term of this patent is extended or adjusted under 35 U.S.C. 154(b) by 1215 days.

(21) Appl. No.: 10/398,607

(22) PCT Filed: Oct. 5, 2001

(86) PCT No.: PCT/US01/31711
§ 371 (c)(1),
(2), (4) Date: Aug. 25, 2003

(87) PCT Pub. No.: WO02/29693
PCT Pub. Date: Apr. 11, 2002

(65) Prior Publication Data
US 2004/0039688 A1 Feb. 26, 2004

Related U.S. Application Data

(60) Provisional application No. 60/238,586, filed on Oct. 6, 2000.

(51) Int. Cl.
*G06Q 40/00* (2012.01)

(52) U.S. Cl. .......................... 705/35; 705/38

(58) Field of Classification Search ............ 705/26, 705/7
See application file for complete search history.

(56) References Cited

U.S. PATENT DOCUMENTS 6,321,206 B1 * 11/2001 Honarvar ............ 705/7
6,622,126 B1 * 9/2003 McArdle et al. ............ 705/26

OTHER PUBLICATIONS

What's a Loyal Customer Worth? Dec. 11, 1995, Fortune, vol. 132, Issue 12, p. 182.*
Wyner, "Customer Valuation: Linking Behavior and Economics," 1996, Marketing Research, vol. 8, Issue 2, p. 36.*

* cited by examiner

*Primary Examiner* — Samica L Norman
(74) *Attorney, Agent, or Firm* — Greenberg Traurig LLP (57) ABSTRACT

The present invention relates to a system and method for estimating the future and present value of credit accounts (FIG. 1). A plurality of profit driver segments (105) are established. A degree of belonging of the credit account to each of the plurality of profit driver segments (105) is determine by characterizing the credit account based upon it historical behavior (110). The probability of migration of the credit account from at least one profit driver segment (105) to at least one profit driver segment based upon historical behavior data is determined. The credit account can then be valued based upon the characterization of the credit account and the determined probability of migration. By examining how accounts migrate between behavior segments over multiple periods, and analyzing the discounted cash flows associated with these migration patterns, a net present value may be calculated for each account.

21 Claims, 10 Drawing Sheets

FIG. 1

| VHR | MR | LMR | LR | HT | LMT | CCLMR | CCMR | CCHR | D |
|-----|----|----|----|----|----|----|----|----|----|
| 65 | 11 | 4 | 2 | 1 | 2 | 1 | 4 | 10 | 0 |

|       | VHR | MR | LMR | LR | HT | LMT | CCLMR | CCMR | CCHR | D  | Closed or C/O |
|-------|-----|----|-----|----|----|-----|-------|------|------|----|---------------|
| VHR   | 60  | 12 | 6   | 0  | 1  | 4   | 0     | 2    | 7    | 2  | 6             |
| MR    | 7   | 50 | 15  | 1  | 1  | 9   | 2     | 2    | 0    | 4  | 7             |
| LMR   | 2   | 9  | 40  | 2  | 3  | 24  | 1     | 0    | 0    | 10 | 7             |
| LR    | 0   | 3  | 10  | 34 | 2  | 23  | 6     | 2    | 1    | 10 | 7             |
| HT    | 4   | 7  | 16  | 2  | 29 | 30  | 1     | 0    | 0    | 7  | 4             |
| LMT   | 0   | 1  | 4   | 1  | 5  | 53  | 0     | 0    | 0    | 29 | 7             |
| CCLMR | 1   | 11 | 10  | 9  | 1  | 7   | 42    | 8    | 3    | 3  | 6             |
| CCMR  | 4   | 13 | 2   | 3  | 0  | 3   | 9     | 49   | 6    | 1  | 9             |
| CCHR  | 15  | 2  | 1   | 1  | 1  | 1   | 2     | 5    | 63   | 0  | 8             |
| D     | 0   | 0  | 1   | 0  | 2  | 8   | 0     | 0    | 0    | 80 | 8             |

| VHR | MR | LMR | LR | HT | LMT | CCLMR | CCMR | CCHR | D |
|---|---|---|---|---|---|---|---|---|---|
| 65 | 11 | 4 | 2 | 1 | 2 | 1 | 4 | 10 | 0 |

200

X

|  | VHR | MR | LMR | LR | HT | LMT | CCLMR | CCMR | CCHR | D | Closed or C/O |
|---|---|---|---|---|---|---|---|---|---|---|---|
| VHR | 60 | 12 | 6 | 0 | 1 | 4 | 0 | 2 | 7 | 2 | 6 |
| MR | 7 | 50 | 15 | 1 | 1 | 9 | 2 | 2 | 0 | 4 | 7 |
| LMR | 2 | 9 | 40 | 2 | 3 | 24 | 1 | 0 | 0 | 10 | 7 |
| LR | 0 | 3 | 10 | 34 | 2 | 23 | 6 | 2 | 1 | 10 | 7 |
| HT | 4 | 7 | 16 | 2 | 29 | 30 | 1 | 0 | 0 | 7 | 4 |
| LMT | 0 | 1 | 4 | 1 | 5 | 53 | 0 | 0 | 0 | 29 | 7 |
| CCLMR | 1 | 11 | 10 | 9 | 1 | 7 | 42 | 8 | 3 | 3 | 6 |
| CCMR | 4 | 13 | 2 | 3 | 0 | 3 | 9 | 49 | 6 | 1 | 9 |
| CCHR | 15 | 2 | 1 | 1 | 1 | 1 | 2 | 5 | 63 | 0 | 8 |
| D | 0 | 0 | 1 | 0 | 2 | 8 | 0 | 0 | 0 | 80 | 8 |

300

| VHR | MR | LMR | LR | HT | LMT | CCLMR | CCMR | CCHR | D | Closed |
|---|---|---|---|---|---|---|---|---|---|---|
| 42 | 15 | 8 | 1 | 1 | 7 | 1 | 4 | 11 | 3 | 6 |

| VHR | MR | LMR | LR | HT | LMT | CCLMR | CCMR | CCHR | D | Closed |
|-----|----|----|----|----|-----|-------|------|------|---|--------|
| 42 | 15 | 8 | 1 | 1 | 7 | 1 | 4 | 11 | 3 | 6 |

400

X

| |
|---|
| $54.85 |
| $34.97 |
| $20.44 |
| $0.78 |
| $12.19 |
| -$4.50 |
| -$11.48 |
| -$18.51 |
| -$6.32 |
| -$9.87 |

SYSTEM AND METHOD FOR MONITORING MANAGING AND VALUING CREDIT ACCOUNTS

CROSS-REFERENCE TO RELATED APPLICATION

This application claims priority under 35 U.S.C. §119(e) from U.S. Provisional Application No. 60/238,586 of Sulkowski et al. filed Oct. 6, 2000 which is herein incorporated by reference in its entirety.

FIELD OF INVENTION

The present invention relates to a system and method for estimating the current and future value of individual credit accounts, and more specifically, to the use of a hybrid methodology of fuzzy logic and Markovian process to value a credit account based upon a probability that the credit account will exhibit a particular behavior pattern as represented by a profit driver segment. The present invention can be leveraged for individual credit accounts across industries (i.e. financial, auto, etc,) and products (i.e. credit cards, loans, etc.). As the term is used herein, credit account is given is broadest interpretation, and includes revolving credit accounts, lines of credit, and any other type of account in which a borrower receives something of value now and agrees to repay a lender at some later date as part of a contractual agreement.

BACKGROUND OF INVENTION

The management of customer relationships for credit accounts continues to be challenging. It is difficult to know which customers drive value today and are likely to drive value in the future, as well as which actions will positively impact value. In general, customer relationship management challenges revolve around: (1) prioritization of customers; (2) setting objectives for each customer; (3) aligning programs/tactics to achieve the objectives; (4) balancing the short-term vs. the long-term; and (5) executing effectively. One goal of credit account management is to anticipate future behavior and profitability of an account based on current and past information regarding profitability and behavior. Characterizing current behavior and profitability is, however, difficult. Credit accounts can be used in many ways, and linking current behavior to profitability can be challenging. Similar behavior can lead to radically different profits in different accounts. Anticipating consumer behavior and profitability is also difficult. Many variables are involved, such as the customer, the account issuer, competitors, products, and environment. Even if behavior can be predicted, it is difficult to quantify the value of a behavior.

What is needed is a system that can address these challenges.

SUMMARY OF THE INVENTION

It is an object of the present invention to provide a method for valuing a credit account based upon a probability that the credit account will migrate from one behavior pattern to another as captured by profit driver segments. A plurality of profit driver segments is established. A degree of belonging of the credit account to each of the plurality of profit driver segments is determine by characterizing the credit account based upon it historical behavior. The probability of migration of the credit account from at least one profit driver segment to at least one profit driver segment based upon historical behavior data is determined. The credit account can then be valued based upon the characterization of the credit account and the determined probability of migration.

It is another object of the present invention to provide a method of prioritizing a plurality of credit accounts, the credit accounts having an account history of at least one period, the account history including at least current period profits and account behavior, the method comprising the steps of: determining a plurality of profit driver segments; for each one of the plurality of credit accounts, selecting a profit driver segment based upon the credit account's account history, thereby grouping together credit accounts that exhibit similar behavior and profitability; assigning to each of the plurality of credit accounts a degree of belonging to the profit driver segments selected for that account; determining a likelihood that a credit account having a given account history will exhibit a behavior similar to those segments to which it belongs in subsequent periods; determining a present value for the credit account based upon the degree of belonging to a profit driver segment and the likelihood of a similar account history in subsequent periods; and prioritizing the credit accounts based upon the present value thereof, thereby facilitating the efficient formulation of marketing programs.

It is another object of the present invention to provide an effective customer relationship management framework including the identification of customers that are of the highest priority. Prioritization includes identifying: (1) which customers are most important to current financial performance; (2) which customers provide the greatest value in the future; and (3) which customers offer the greatest potential value or opportunity in the future. The framework clarifies how customer behaviors impact portfolio performance, and define objectives for each customer and align marketing tactics to customer objectives. By establishing a behavioral baseline of customer migration, the framework clarifies the impact and likelihood of customer behavior change if a particular customer management action is undertaken, including no action.

The present invention is also to a method for valuing a profit and loss component of a credit account based upon the probability that the credit account will migrate between profit driver segments. A plurality of profit driver segments is established. A degree of belonging of the credit account to each of the plurality of profit driver segments is determine by characterizing the credit account based upon it historical behavior. The probability of migration of the credit account from at least one profit driver segment to at least one profit driver segment based upon historical behavior data is determined. The profit and loss component of the credit account can then be valued based upon the characterization of the credit account and the determined probability of migration.

The present invention, referred to as the Lifetime-value (LTV) framework, is directed to a system and method that permits accurate forecasting of the future value of credit accounts. The LTV framework estimates the Lifetime-value of each credit account. An account is characterized by its cash flows, product attributes, and degree of belongingness to customer behavior segments based on common patterns such as revolving and transacting. By examining how accounts migrate between behavior segments over multiple quarters and analyzing the discounted cash flows associated with these migration patterns, a net present value is calculated for each account.

The Lifetime-value is thus risk-based, in that it takes the past, current and future charge-off risk of an account into consideration, and includes a capital charge, i.e. the cost associated with capital employed by a financial institution, for example, to provision for unanticipated risk.

The LTV framework represents a significant departure from traditional modeling in the credit card industry. Specifically Markov processes coupled with fuzzy segmentation techniques have not been employed prior to this work. Previous modeling techniques have relied on regression analysis rather than probabilistic approaches. Finally, the LTV system provides software both to calculate the value of an account given current account characteristics (i.e., pricing, line allocation, etc.) as well as to simulate and estimate the impact of changes in account characteristics.

In one embodiment of the present invention, the method is directed to defining segments of credit accounts so as to group those customers exhibiting similar behaviors and profitability. These segments are created using an unsupervised clustering technique incorporating each individual account's profit and loss (P&L) components. Differences in interest rates are standardized in order to mitigate the differences in P&Ls due to pricing rather than behavior. The resulting segments are represented as a vector of individual P&L line items.

In another embodiment of the present invention, the method allows account managers to calculate the degree of belongingness of each credit account to each of the segments. The degree of belongingness is represented as a vector referred to as the initial membership vector.

In another embodiment, the method permits account managers to calculate the degree of migration of an account from one behavior segment to another from one period to the next period, and to calculate the cash flows associated with similar pricing and customer management actions. These migrations are based on the understanding that some patterns of customer behavior can be generated by product, environment, competitors, the account issuer, or the customer. The migration patterns and cash flows are represented as transition matrices and cash flow vectors.

In another embodiment, the method permits account managers to forecast the value of a credit account as a Markov Chain. One unique feature of the LTV method is that it can forecast cash flows of individual credit accounts using a Markovian probabilistic model. Specifically the method estimates an initial membership vector and calculates the probability of exhibiting a future behavior pattern by multiplying the initial membership vector with the appropriate transition matrix. The method estimates the cash flow anticipated in that period as characterized by the cash flows associated with each behavior pattern multiplied by the probability of that behavior pattern. Subsequent periods are estimated in a similar Markov Chain.

In another embodiment, the LTV method enables account managers to estimate the value of an account in the future with a high degree of accuracy. This enables managers to quantify the financial implications of account behavior and migration. The invention includes a series of statistical tests that demonstrate the effectiveness of this approach as a forecasting approach and tool.

DETAILED DESCRIPTION OF THE INVENTION

The present invention is directed to a system and method that permits accurate forecasting of the future value of credit accounts. In one embodiment of the invention the system is referred to as the Lifetime-value (LTV) framework.

The discussion below references several terms specific to the present invention. A glossary of these terms is as follows:

Profit Driver Segments (also know as behavioral segments): A behavioral segmentation scheme which groups accounts into clusters of similar behavior patterns based on the account's individual P&L and an unsupervised clustering technique. These behavior patterns drive profitability. The segmentation scheme is derived by first translating customer behavior into an account P&L and then clustering accounts together with similar P&L's. (There are, however, no hard and fast rules determining which account falls into which segment. Each account receives a profit driver tag based on the account's historical behavior.) The dollar amounts specified for each segment reflect current values. As an illustration based on credit card accounts, the profit driver segments can include:

1. Very Heavy Revolvers (VHR): The most profitable segment. Accounts that usually revolve over $7,000 and have moderately low risk usually are tagged into this group.
2. Moderate Revolvers (MR): Usually the second most profitable segment. Accounts in this segment tend to revolve an average of $4,000 and are slightly higher risks than the Very Heavy Revolvers.
3. Light-Moderate Revolvers (LMR): Usually the third most profitable segment. Accounts in this segment tend to revolve an average of $2,500.
4. Light Revolvers (LR): A mix of profitable and unprofitable customers. Good risk scores and typical revolving balances of $1,000.
5. Heavy Transactors (HT): Profitable customers who generate most of their revenue from interchange on large purchase volumes. Virtually no revolving balances and extremely low risk. Average monthly purchase volume is typically $1,000.

6. Light-Moderate Transactors (LMT): Usually a large segment within an issuer's portfolio, these customers are unprofitable due to a lack of revenue—low purchase volume, low revolving balances, good risks.
7. Credit Challenged Light Revolvers (CCLR): A mix of profitable and unprofitable customers. Poor credit scores drive higher costs. Low revolving balances.
8. Credit Challenged Moderate Revolvers (CCMR): Unprofitable customers with average revolving balances around $3,000. Low credit scores drive high costs.
9. Credit Challenged Heavy Revolvers (CCHR): The most unprofitable segment. Revenues from very high revolving balances are overwhelmed by very high loan loss provisions.
10. Dormant (D): Unprofitable segment. No revenue, yet costs an issuer to maintain. Segment is defined as no balances and no purchases.

Other profit driver segments may be more suited to other data populations.

Crisp Profit Driver Segment: The profit driver segment to which an account has the greatest degree of belonging.

Initial Membership Vector (IMV): A series of tags for an individual account that represent the account's degree of "belongingness" to each of the profit driver segments. Preferably, every account receives an IMV for each period and the IMV consists of percentages that sum to 100%.

Cash Flow Vector: A vector consisting of dollar values which represent the average cash flows for each of the profit driver segments for a single period.

Transition Matrix: An M×N matrix of probabilities that an account in a profit driver segment will migrate to another in a subsequent period. Rows in the matrix are the profit driver segments and represent current behavior patterns. Columns are the profit driver segments and the "states" of closed and charged off accounts, and represent future behavior patterns. Each row sums to 100% and each cell represents the probability that an account tagged as that row's profit driver segment (e.g., Very Heavy Revolver) will migrate to that column's profit driver segment (e.g., Moderate Revolver) in the next period. Many transition matrices can be defined based upon the characteristics of a group of accounts in the current period (e.g., intro-rate accounts or accounts with a specific account treatment) and the characteristics of that same group in the future period (e.g., intro-rate expiration accounts). Transition matrices are preferably built from historical data.

Net Income After a Capital Charge (NIACC): A measure of profitability. This measure is used at the account level, is both risk- and capital-adjusted. NIACC values for each cycle can be stored in tables maintained by the user.

Account Management Action: An account management action is a change in a credit product attribute instituted by the account management, for example, changing the credit account APR.

In one embodiment of the present invention the system includes three modules: (1) an Account Characterization Module, (2) a Transition Matrix Module, and (3) a Net Present Value Module. A user can control these modules via a user interface. In one embodiment of the invention, the user interface is a LTV Framework User Interface.

Figure 1:
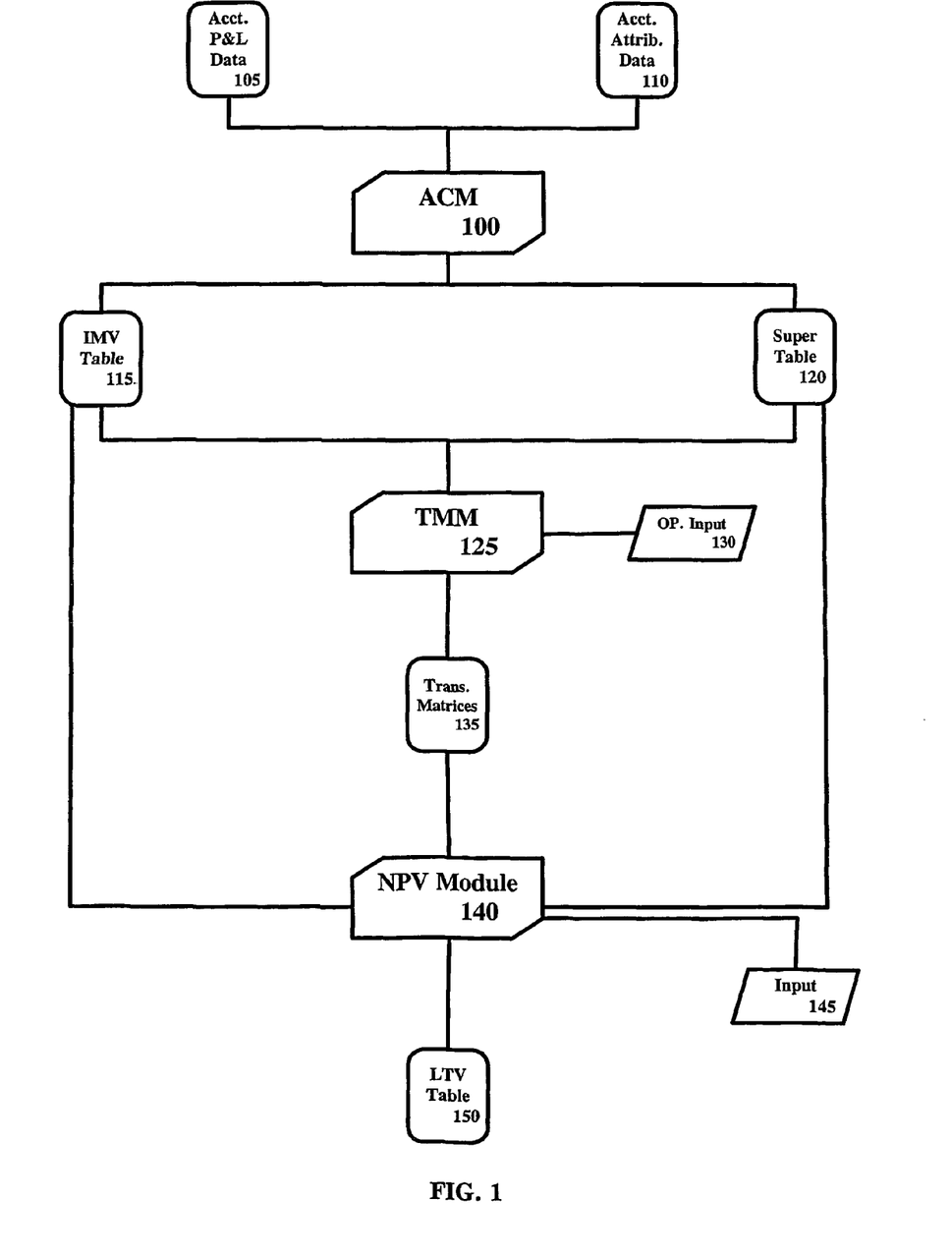
FIG. 1 depicts a block diagram illustrating the system components according to one embodiment of the present invention.

A block diagram illustrating the system components according to one embodiment of the invention is shown in FIG. 1. Although these components are described as performing particular functions and/or tasks for the purpose of example, one of ordinary skill in the art would appreciate that any number or combination of components may be utilized to carry out the desired operations.

The Account Characterization Module (ACM) 100 defines credit accounts based on profit and loss elements, initial membership vectors, and account attributes.

In one embodiment of the invention ACM 100 characterizes the credit products associated with each credit account by the credit product attributes. Credit product attributes may include, for example, an account's current or a change in an account's price, interest rate or APR, promotional APR, credit line, annual fees, reward points, color of a credit card, brand of a credit card, grace period for delinquent repayment, repayment terms and fix/variable interest rate. The Account Characterization Module 100 then determines the various account attributes (tags) that describe each account.

In one embodiment of the invention, to perform these functions the ACM 100 is operatively connected to Account Profit and Loss Data (Account P&L) 105 and Account Attribute Data (AAD) 110. The Account P&L 105 maintains profit and loss data for each credit account obtained from the cycle NIACC table. Similarly the AAD 110 maintains attribute data for the credit products associated with each credit account from the cycle NIACC table, as well as from other data sources in the analytic database (not shown). In one embodiment, an analytic database contains individual credit account behavior and current credit product types and attributes.

The Account Characterization Module 100 calculates a degree of belongingness for each account to each of the Profit Driver segments based on current period cash flow elements, and determines the crisp profit driver segment for each credit account. Dormant, closed and charged-off accounts are identified as having 100% degree of belongingness to those particular segments. In one embodiment of the invention, this information is output and stored in two data tables, an Initial Membership Vector (IMV) Table 115 and a Super Table 120.

The IMV table 115 contains output for credit accounts pertaining to the most recent time period and includes: the degree of belongingness to every profit driver segment (the account's initial membership vector (IMV)); the profit driver segment to which a credit account is most closely aligned (crisp profit driver segment); all credit product attributes that define the credit account and the product of that account (e.g. APR, age of account, credit line, etc.); and the net income for the period, preferably for the most recent three cycles. The Super Table 120 stores the following data for multiple historical periods, and would preferably include data reflecting the most recent: degree of belongingness to every profit driver segment (the account's initial membership vector (IMV)); the profit driver segment to which a credit account is most closely aligned (crisp profit driver segment); credit product attributes that define the credit account and the product of that account (e.g. APR, age of account, credit line, etc.); and profit and loss elements used for account forecasting.

Figure 2:
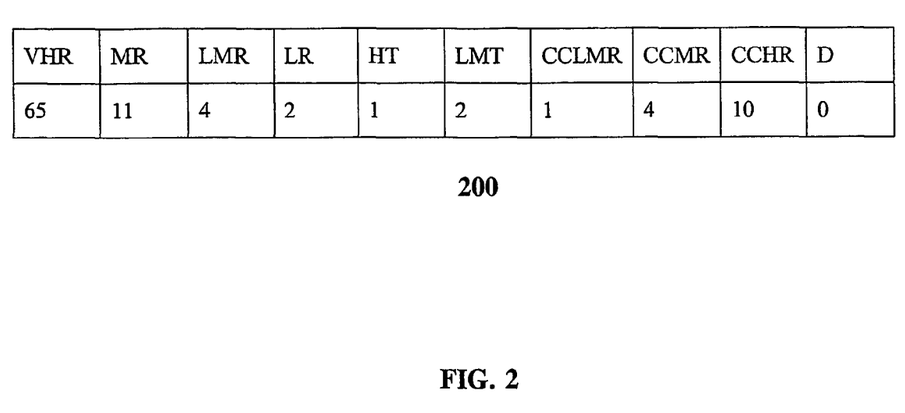
FIG. 2 shows a diagrammatic representation of an initial membership vector according to one embodiment of the present invention.

A diagrammatic representation of an initial membership vector 200 according to one embodiment of the present invention is shown in FIG. 2.

For the purpose of illustration, the first row of the vector shows labels identifying the profit driver segments. As described earlier, VHR is very heavy revolver; MR is medium revolver, and so forth. The actual numerical values that define the initial membership vector are shown in row 2 as a percentage. By way of example, the initial membership vector indicates that the credit account being described is considered to be a 65% very heavy revolver, 11% medium revolver, 4% light-moderate revolver, 2% light revolver, 1% heavy transactor, 2% light-moderate transactor, 1% credit challenged light revolver, 4% credit challenged moderate revolver; and 10% credit challenged heavy revolver. The sum of the profit driver segment percentages equals 100%. The crisp profit driver segment, i.e. the profit driver segment to which an account has the greatest degree of belongingness, is VHR (very heavy revolver) since the 65% in the VHR column is the highest percentage of the all the profit driver segments.

In addition, the vector 200 indicates that the account is not dormant, but active, designated by a 0% in the dormant column.

Returning again to FIG. 1, the Transition Matrix Module (TMM) 105 is operatively connected to the output from ACM 100, i.e. the IMV Table 115 and Super Table 120.

The TMM 125 creates transition matrices that capture cash flows by Profit Driver Segment, as well as the likelihood that a credit account exhibiting a particular behavior pattern will exhibit anticipated behavior patterns in subsequent periods based on a user input 130. User input may include, for example, a list of transition matrices to create based on desired profit driver segments and/or product attributes.

The TMM 125 uses the IMV table 115 to identify the crisp profit driver segment and product attributes for each credit account in a population. The TMM 125 then groups the credit accounts based on similar behavior patterns and product attributes. Transition matrices are formed that capture the probabilities associated with various credit account migration patterns for each defined credit account management action.

The output from the TMM 125 is a set of one or more transition matrices stored in Transition Matrix Table (TMT) 135. In one embodiment of the invention, the columns of the transition matrices may define the profit driver segments and the rows of the transition matrix may define the probability of the group of credit accounts migrating to the profit driver segment for the given period. Accordingly, the TMT 135 stores migration patterns, cash flows and average values for each forecasting element for each profit driver segment.

Figure 3:
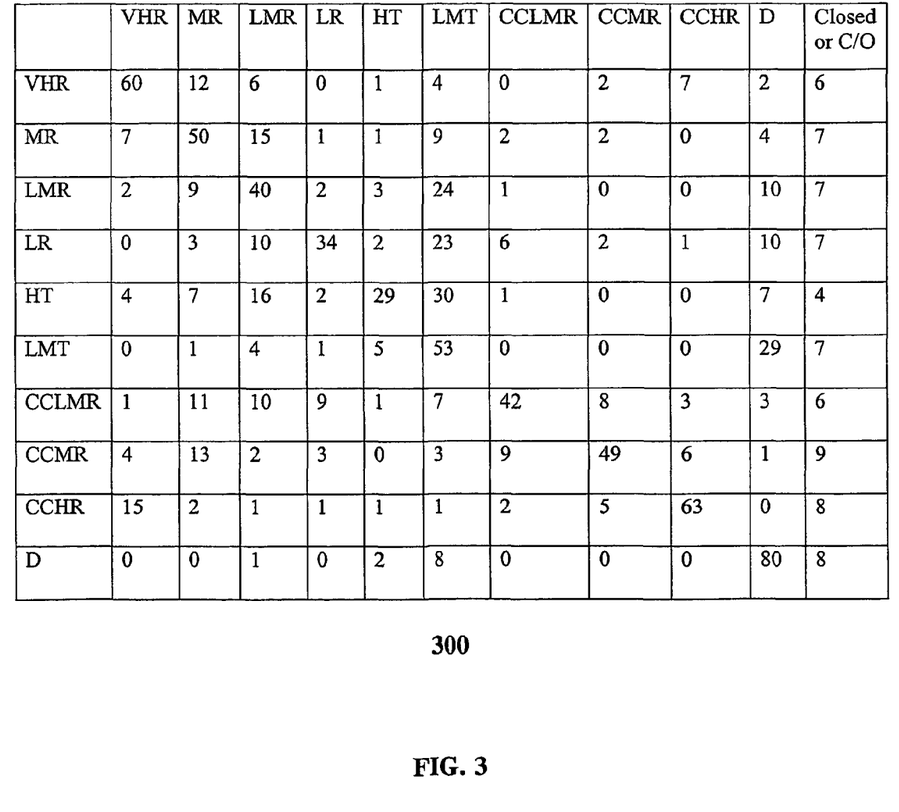
FIG. 3 is a diagrammatic representation of a Transition Matrix according to one embodiment of the present invention.

A diagrammatic representation of a Transition Matrix 300 according to one embodiment of the present invention is shown in FIG. 3.

For the purpose of illustration, the first row of the matrix shows the profit driver segment that describes the group of credit accounts. As described earlier, VHR is very heavy revolver; MR is moderate revolver, and so forth. Similarly, the first column of the matrix shows the profit driver segments as they are used to describe the group of credit accounts in the horizontal row. As described earlier, rows in the matrix are the profit driver segments and represent current behavior patterns. Columns are the profit driver segments and the "states" of closed and charged off accounts, and represent future behavior patterns. Each row sums to 100% and each cell represents the probability that an account tagged as that row's profit driver segment (e.g., Very Heavy Revolver) will migrate to that column's profit driver segment (e.g., Moderate Revolver) in the next period.

Using FIG. 3 as an example, the first numerical row is for a group categorized as very heavy revolvers. The numerical values indicate that there is a 60% probability of an account in this group staying a very heavy revolver in the next period following the given credit account management action; a 12% probability of an account in this group becoming a moderate revolver in the next period following the credit account management action; a 6% percent probability of an account in this group becoming a light-moderate revolver in the next period following the credit account management action; and so forth.

Similarly, the second numerical row is for a group categorized as moderate revolvers. The numerical values in this row indicate that there is a 7% probability of an account in this group becoming a very heavy revolver in the next period following the credit account management action; a 50% probability of an account in this group remaining a moderate revolver in the next period following the credit account management action; a 15% probability of an account in this group becoming a light-moderate revolver in the next period following the credit account management action; an so on.

The Transition Matrix 300 also includes a column describing closed or charged-off (C/O) accounts. This column describes the probability of a given group of credit accounts closing the account in the next period following the credit account management action. Using the first numerical row (i.e. very heavy revolvers) as an example, there is a 6% probability that a credit account in this group with be charged-off or closed in the next period following the credit account management action.

Turning again to FIG. 1, the Net Present Value Module 140 is operatively connected to the initial membership vectors stored in IMV Table 115 and Super Table 120; and the transition matrices 135. NPV Module 140 examines a credit account's initial membership vectors and the probabilities of that particular credit account exhibiting particular behavior patterns in subsequent periods (transition matrices 135) and generates a net present value for each account in one or more future periods.

The NPV Module 140 may also receive other select inputs 145 from a user when generating the net present value of an account. Other select inputs 140 may include, for example, an adjusted cash flow discount rate, and the number of periods into the future for which to calculate forecasted Lifetime-value.

A new membership vector (NMV) characterizes each account's degree of belonging to the profit driver segments in a future period. This calculation may be iterated for as many periods as one desires to project. It should be noted; however, that the number of iterations is finite (is a finite value) as all credit accounts eventually close. Credit accounts may be closed, for example, through attrition—as by affirmative action of the credit account owner, by death of the credit account owner, or by action of credit account management.

The new membership vector (NMV) is multiplied by a Cash Flow Vector to obtain the Next Period Discounted Cash Flow. The Lifetime-value (LTV) is then the sum of Discounted Cash Flows for each account.

The baseline LTV thus represents an account's value to the financial institution's future profit potential, assuming that the account maintains the same account attributes over the time period being evaluated. The baseline Lifetime-value evaluates the future profitability of each account based on its current attributes and not on its potential given that the attributes are altered via account management.

Figure 4:
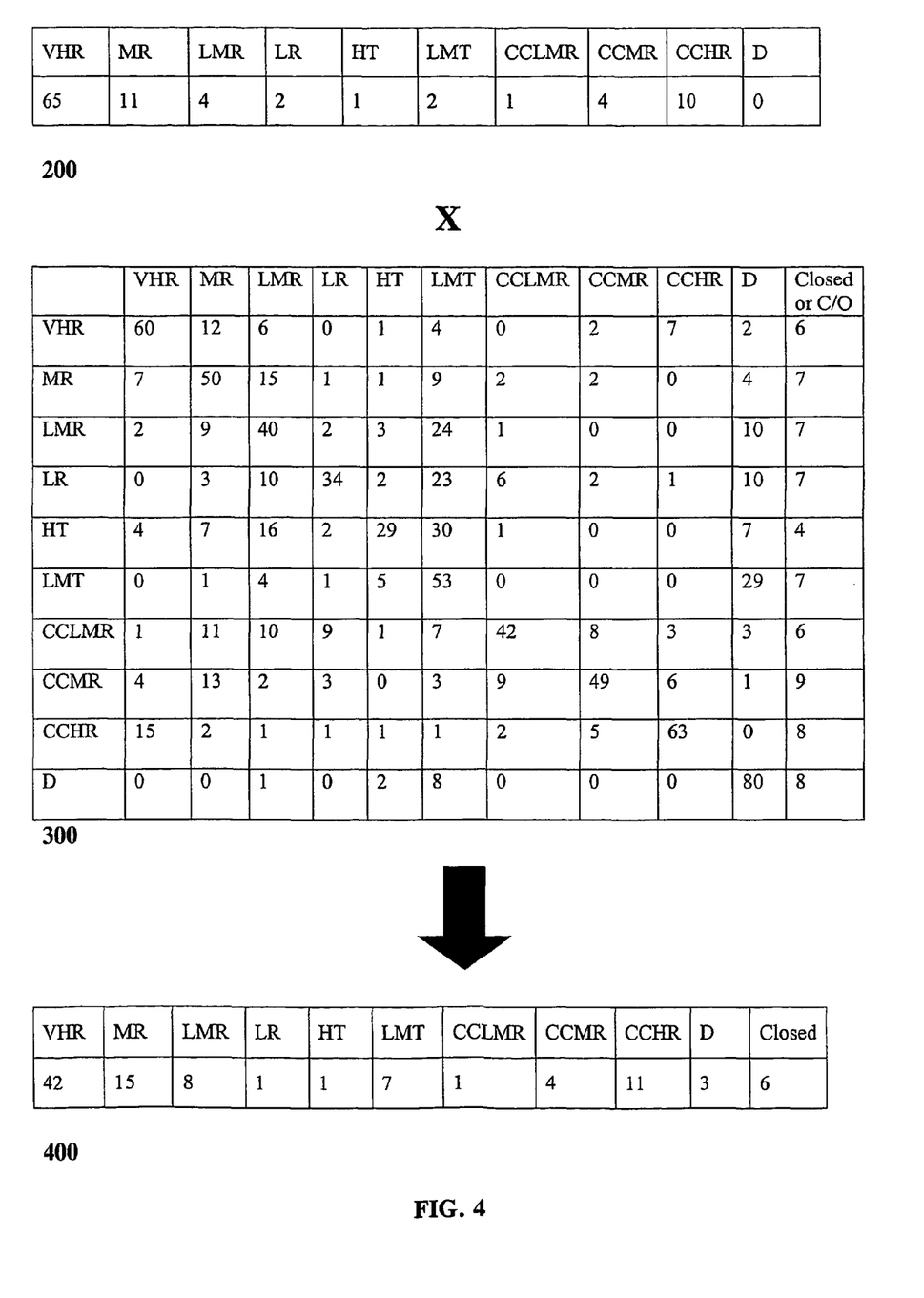
FIG. 4 is a diagrammatic representation showing the vector/matrix multiplication to obtain a new membership vector (NMV) according to one embodiment of the present invention.

A diagrammatic representation showing the vector/matrix multiplication to obtain the new membership vector (NMV) 400 according to one embodiment of the present invention is shown in FIG. 4.

In the embodiment of the invention as shown, initial membership vector 200 is multiplied by transition matrix 300 to obtain new membership vector 400. Standard mathematical principles are used to complete this operation as are well known in the art. By way of example, each profit driver segment term in the row of the initial membership vector 200 is multiplied by the corresponding profit driver segment term in the column of the transition matrix 300. The products of these multiplications are then summed along the column for a particular profit driver segment to arrive at the corresponding profit driver term in the new membership vector. Using the illustrated embodiment as an example we have the following vector multiplication to obtain the VHR term in the new membership vector:

$$(.65)(.60) + (.11)(.07) + (.04)(.02) + (.02)(0) + (.01)(.04) + (.02)(0) +$$
$$(.01)(.01) + (.04)(.04) + (.1)(.15) + (0)(0) = .4156 \text{ or } 41.56\% \ (42\%)$$

Similar operations would be completed for all columns in the transition matrix 300 until the new membership matrix 400 is complete. In the examples, the percentages are rounded to the nearest percent, for simplicity. Preferably at least two decimal points of precision are used.

As described earlier, the new membership vector 400 is multiplied across the average cash flow for every profit driver segment to obtain a future period cash flow. This cash flow is then discounted to derive a net present value figure.

Figure 5:
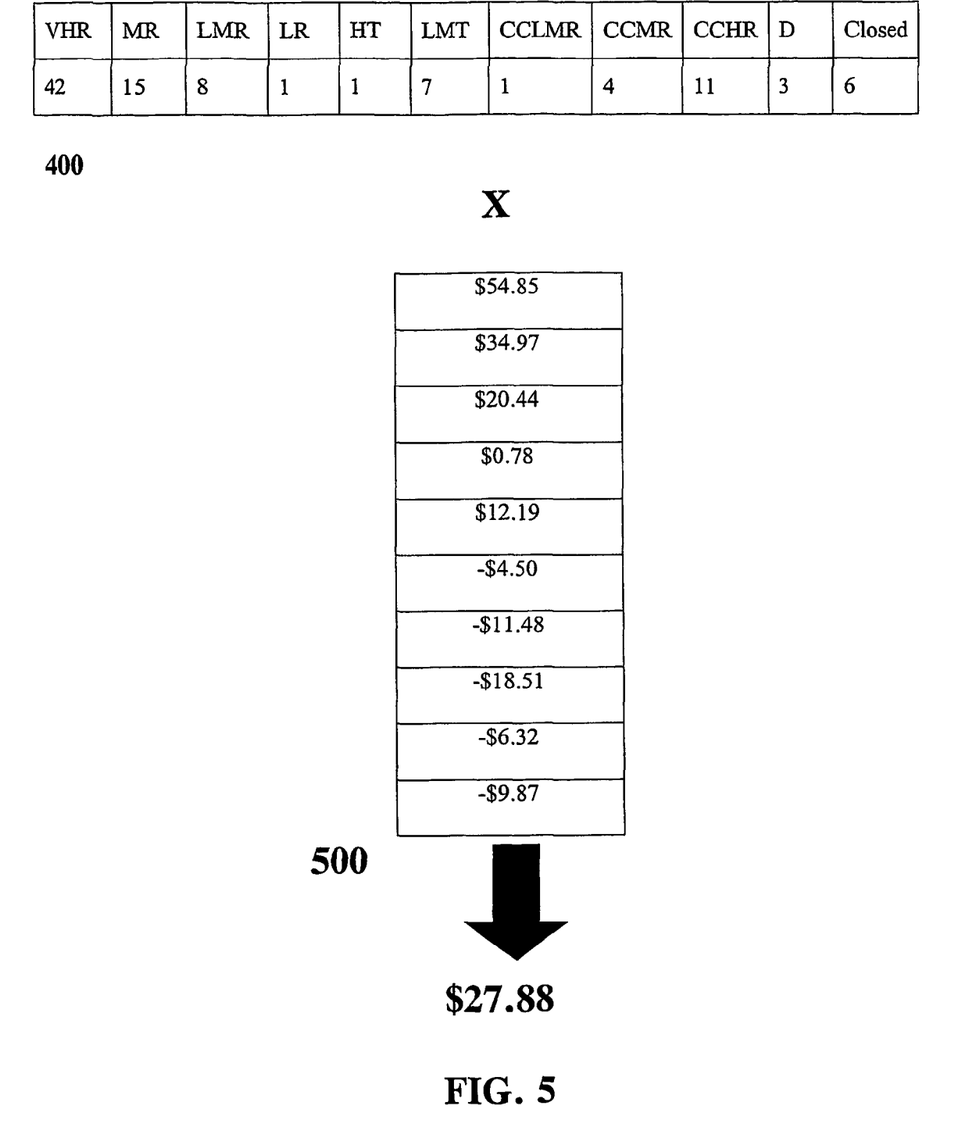
FIG. 5 is a diagrammatic representation showing the vector multiplication to obtain a future period cash flow according to one embodiment of the present invention.

A diagrammatic representation showing the vector multiplication to obtain the future period cash flow according to one embodiment of the present invention is shown in FIG. 5.

In the embodiment of the invention as shown, new membership vector 400 is multiplied by cash flow vector 500 to obtain the next period expected cash flow. Standard mathematical principles algebra are used to complete this operation as are well known in the art. By way of example, each profit driver segment term in the row of the new membership vector 400 is multiplied by the corresponding cash flow term in the column of the Cash Flow Vector 500. The products of these multiplications are then summed to arrive at the next period expected cash flow. Using the illustrated embodiment as an example we have the following vector multiplication to obtain the next period expected cash flow:

$$(.42)(\$54.85) + (.15)(\$34.97) + (.08)(\$20.44) +$$
$$(.01)(\$0.78) + (.01)(\$12.19) + (.07)(-\$4.50) + (.01)(-\$11.48) +$$
$$(.04)(-\$18.51) + (.11)(-\$6.32) + (.03)(-\$9.87) = \$27.88$$

Once the Net Present Value Module 140 calculates the next period expected cash flow, it may also discount period cash flows to estimate the Lifetime-value of each credit account for a specified number of periods. For the purpose of illustration, assume a current period cash flow of $118.00. The current period cash flow may be defined as the earnings generated by the account for the current period before depreciation, amortization and non-cash charges i.e. the difference between income generated by the account and account expenses for the current period. Using the next period expected cash flow calculated above, and a hurdle (discount) rate for a particular initiative of 10% per period, the net present value at the end of one period would be as follows:

$$\$118 + \$27.88/(1+0.1) = \$143.36$$

The net present value for multiple periods may be calculated by iterating the steps described above.

Figure 6:
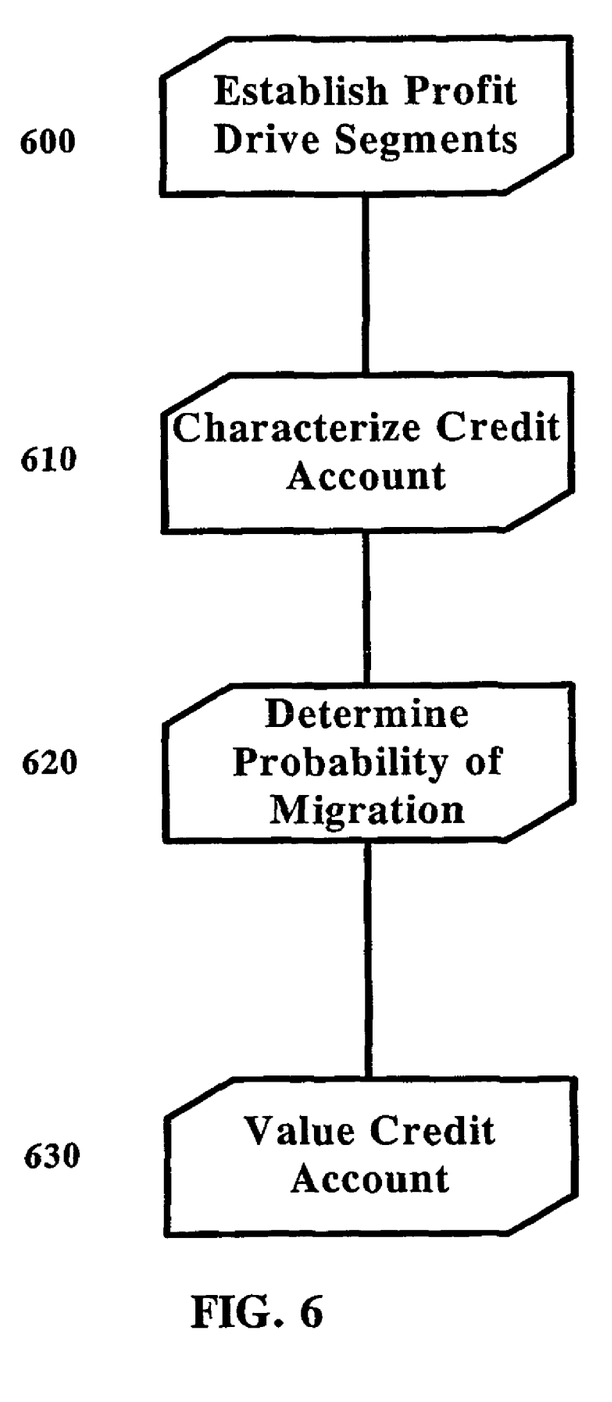
FIG. 6 is a flow chart illustrating the steps to value a credit account based upon a probability that the credit account will migrate between profit driver segments over a time period according to one embodiment of the present invention.

A flow chart illustrating the steps to value a credit account based upon a probability that the credit account will migrate between profit driver segments over a time period according to one embodiment of the present invention is shown in FIG. 6. Similar steps may be used to forecast and value one or more profit and loss components of the credit account.

A plurality of profit driver segments are first established as shown in step 600. As described earlier, the profit driver segments represent a behavioral segmentation scheme that groups credit accounts into clusters of similar behavior patterns based on the credit account's belongingness. In one embodiment of the invention the profit driver segments include: very heavy revolvers; moderate revolvers; light-moderate revolvers; light revolvers; heavy transactors; light-moderate transactors; credit challenged light revolvers; credit challenged moderate revolvers; credit challenged heavy revolvers and dormant accounts. Other profit driver segments may be used where accounts exhibit different behaviors. For example, different profit driver segments may be used on an industry by industry basis.

Profit driver segments can be established by analyzing historical credit account behavior data for a population of credit accounts. This allows the segmentation scheme to be used by credit account management companies to, for example: establish a foundation understanding of customer behavior, risk and profitability (i.e. how credit accounts are behaving and how the account management companies are making money based on the behaviors); identify overall relationship management objective and priorities; and prioritize credit accounts for attrition management. It also allows for the development of attrition-stemming strategies tailored to specific types of customers.

Figure 7:
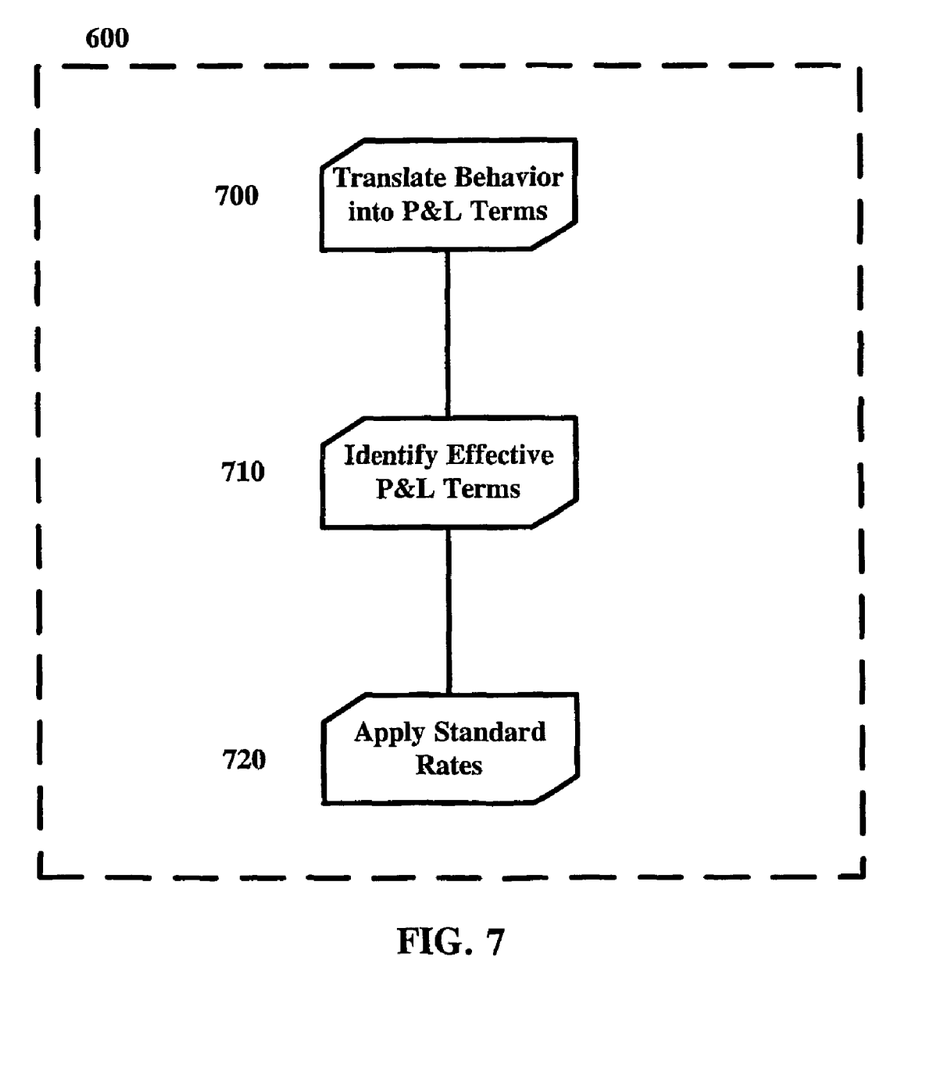
FIG. 7 is a flow chart illustrating the steps used to analyze the historical credit account behavior data for the population of credit accounts according to one embodiment of the present invention.

The steps used to analyze the historical credit account behavior data for the population of credit accounts according to one embodiment of the present invention are shown in FIG. 7.

At step 700, historical credit account behavior data is translated into profit and loss (P&L) terms. P&L terms may include, for example: finance charges; interchange (for credit card accounts); annual fees; punitive fees; fee waivers; equity credit; statement stuffer revenue; list sales revenue; ancillary product/service revenue; cost of funds; credit costs; product costs; original expense; loan loss provision on balances; loan loss provision of unutilized credit line; customer service expense; overhead expense; marketing expense and other expenses (i.e., collections and fraud).

Once the historical credit account behavior has been translated into P&L terms, a set of P&L terms deemed effective in characterizing the credit account behavior and profitability is identified. Selecting a smaller set of P&L terms allows for greater simplicity and robustness when assigning individual credit accounts to profit driver segments. In one embodiment of the invention, the following P&L terms are used in the set: finance charges; interchange; annual fees; fee waivers; cost of funds; loan loss provision on balances; loan loss provision on unutilized line; customer service expense and other expenses (collections and fraud). Other P&L terms may be used where accounts exhibit different behaviors.

Once the set of P&L terms is established, standardize rates are applied to the set to isolate the credit account behavior from pricing impact as shown in step 720. Standard rates are approximately 17% for credit card accounts. By way of a credit card example, the following table illustrates possible standard rates that may be applied to the P&L terms indicated:

| PROFIT AND LOSS TERM | STANDARD RATE CALCULATION |
|---|---|
| Finance Charges | Average revolving balance (calculated as finance charges divided by account-level blended APR) multiplied by the average APR for the portfolio |
| Interchange | Total merchandise volume multiplied by standard interchange rates |
| Annual Fees | Annual fee amount |
| Fee Waivers | Total fee waivers |
| Cost of Funds | Average daily balance multiplied by standard costs of funds rate |
| Loan Loss Provisions on | Average daily balance multiplied by loan loss provision rate (based on customer's |

-continued

| PROFIT AND LOSS TERM | STANDARD RATE CALCULATION |
|---|---|
| Balance | risk profile—Delinquency status, FICO and behavior scores) |
| Loan Loss Provision on Unutilized Line | Average unutilized line multiplied by standard loan equivalence factor multiplied by loan loss provision rate (based on customer's risk profile) |
| Customer Service Expense | Total customer service expenses |
| Other Expense (Collections and Fraud) | Total transaction volume multiplied by standard fraud rate plus collections expense |

The profit driver segments are then determined from the P&L terms by utilizing an unsupervised clustering program. The objective of the cluster analysis is to minimize the variance in profitability within each segment, while maximizing the variance in profitability between the different segments. The use of a cluster analysis is well known in the art. In one embodiment of the invention, K-means clustering is used to build the profit driver segmentation scheme.

By way of example, the following ten profit driver segments may appropriately characterize the spectrum of credit card behavior and profitability: very heavy revolver; moderate revolvers; light/moderate revolvers; light revolvers; heavy transactors; light/moderate transactors; credit challenged—light/moderate revolvers; credit challenged—moderate revolvers; credit challenged—heavy revolvers; and dormant.

Turning again to FIG. 6, once the profit driver segments are established, each credit account is characterized based upon its historical behavior as illustrated in step 610. This characterization is used to determine a degree of belonging of the credit account to each of the profit driver segments.

Characterizing the credit account data based upon its historical data may include, for example, comparing profit and loss (P&L) data for a particular credit account to the average profit and loss data for a population of credit accounts. This comparison is made on a profit diver segment by profit driver segment basis.

Figure 8:
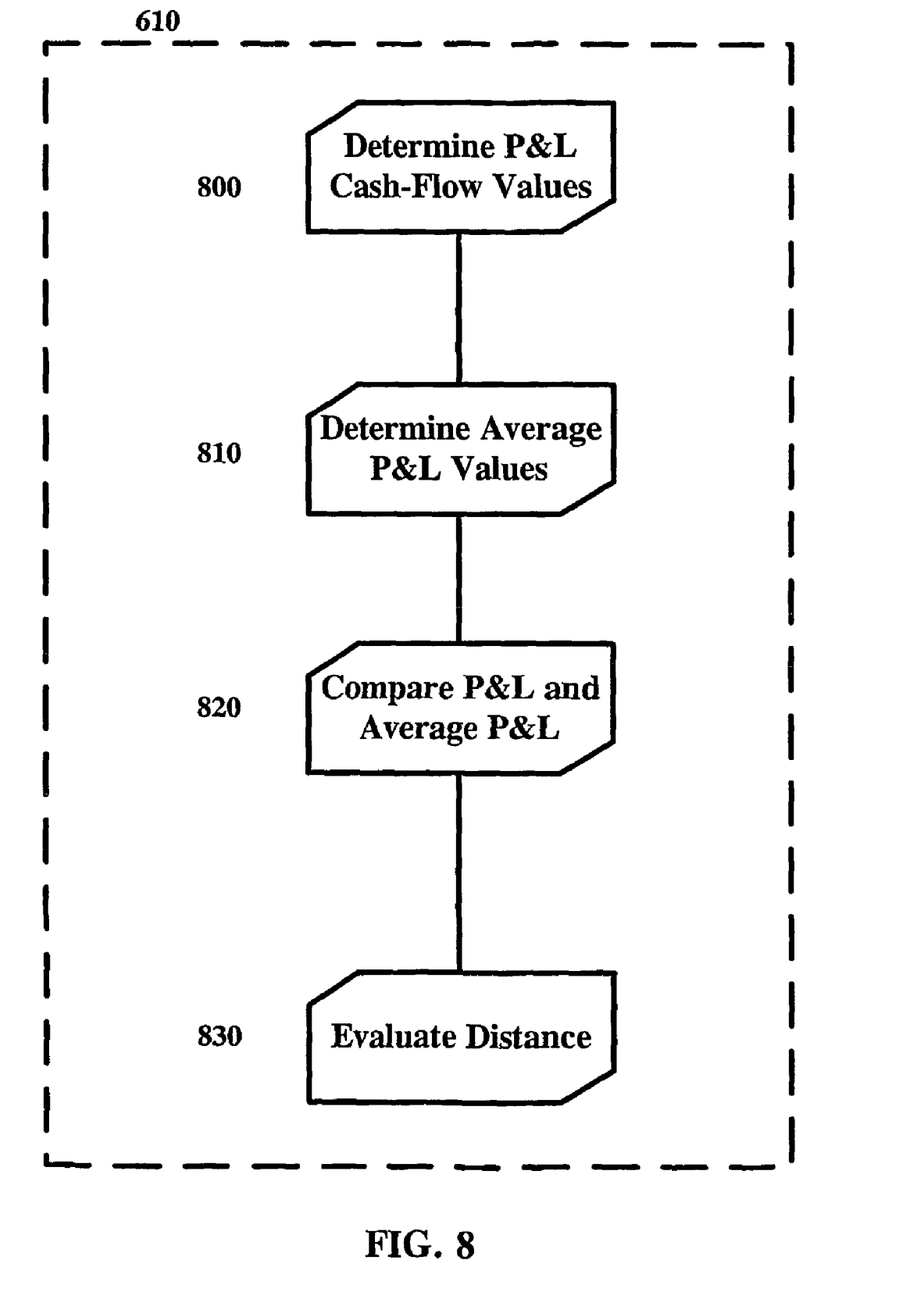
FIG. 8 is a flow chart illustrating the steps to compare the profit and loss data for the credit account and population of credit accounts according to one embodiment of the present invention.

The steps to compare the profit and loss data for the credit account and population of credit accounts according to one embodiment of the invention are shown in FIG. 8. As shown in step 800, P&L cash flow values for each of the profit driver segments characterizing the credit account are determined. The P&L cash flow values may, for example, be obtained from cycle NIACC tables maintained by the system user.

The average P&L cash flow value for each of the profit driver segments characterizing the population of credit accounts is also determined as shown in step 810. These values may be determined by, for example, first obtaining the P&L cash flow values for each profit driver segment in each of the credit accounts in the population from NIACC tables. Once these values are obtained, the P&L values for each profit driver segment are averaged. These average P&L values are sometimes referred to as the centroids for each profit driver segment.

The P&L cash flows for each credit account are then compared to the centroid P&L values for the population on a profit driver segment by profit driver segment basis as shown in step 820.

The distances between these values are then evaluated as shown in step 830. When evaluating these values, the distance between each of the P&L cash flow values and centroid P&L values is determined. In one embodiment of the invention, the step of evaluating the distance comprises calculating the distance between each P&L cash flow values and the centroid P&L value for each of the profit drive segments characterizing the credit account, and applying a function to the distance to fine tune the forecast accuracy. The product is then scaled to one. In a preferred embodiment, the distance is calculated as the square root of the sum of the squares of the distances of standardized cash flow values. The function to fine tune the forecast accuracy is $(1/distance^a)$, where "a" is calculated with the objective that error is minimized (e.g. $1/distance^3$ or $1/distance^4$).

Once the distances for each profit driver segment are quantified, the results may be saved in vector format in an Initial Membership Vector (IMV). Each term or value in the IMV represents the degree of belonging of the particular credit account to a specific profit driver segment, the sum of the values totaling 100%. An example of an IMV was previously described in FIG. 2.

Turning again to FIG. 6, once the credit account is characterized based upon its historical behavior, a probability of the credit account migrating from one profit driver segment to another profit driver segment is determined as illustrated in step 620. Preferably, this probability is determined based, at least in part, on the historical behavior data of a population of credit accounts with similar attributes.

In many instances credit account behavior changes after the happening of an event or action instituted by the credit account manager. For example, a credit account management action may be a drop in APR, increase in rewards points, etc. Accordingly, determining the probability of migration of the credit account may comprise, for example, analyzing the migration of a population of credit accounts between profit driver segments upon the happening of such an account management action.

Figure 9:
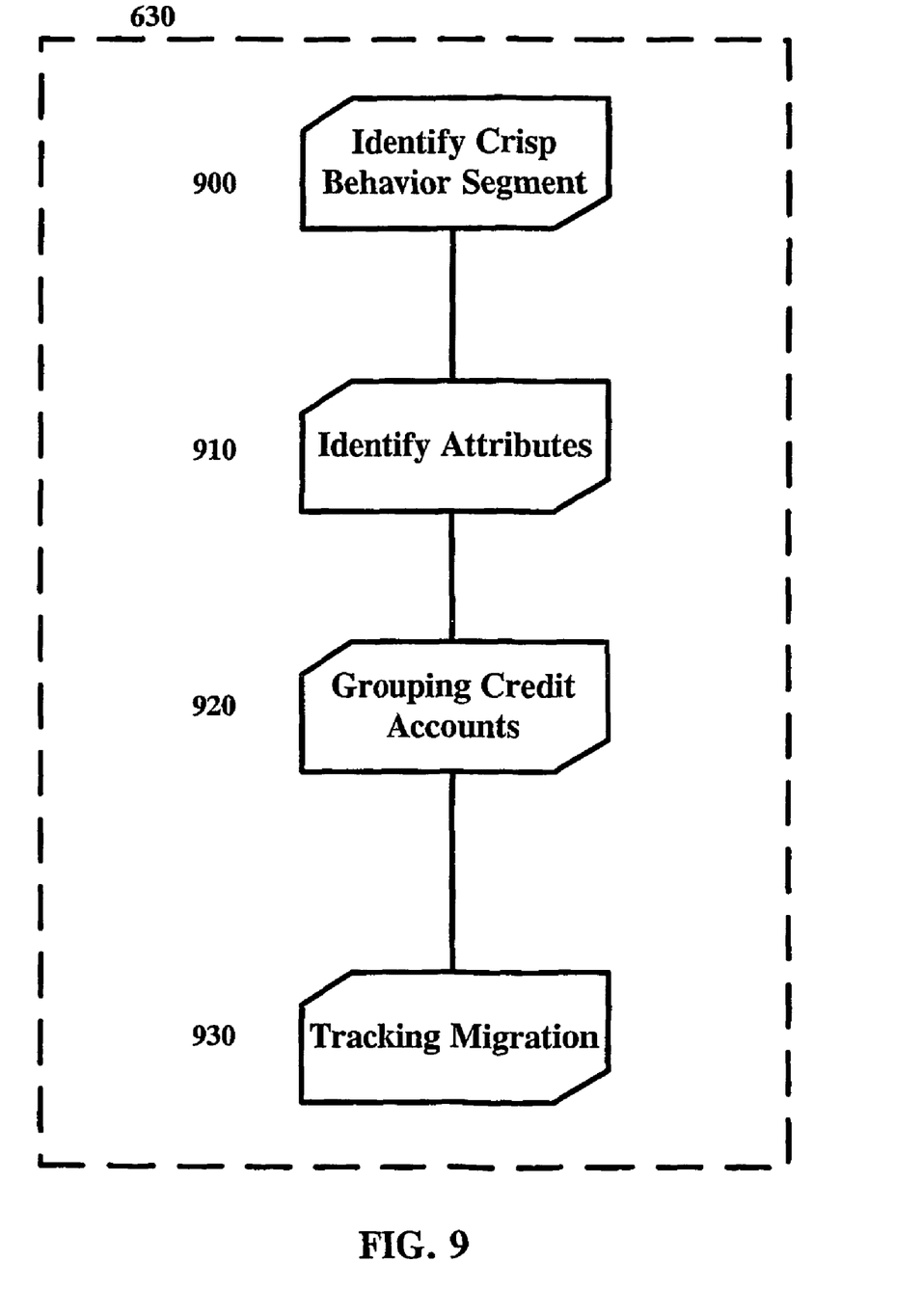
FIG. 9 is a flow chart illustrating the steps to analyzing the migration of a credit account according to one embodiment of the present invention.

The steps to analyzing the migration of a credit account according to one embodiment of the invention are show in FIG. 9. In step 900 a crisp profit driver segment for each credit account in the population of credit accounts is determined. The crisp profit driver segment is defined as the profit driver segment to which an account has the greatest degree of belonging. That is to say that the crisp profit driver segment is the profit driver segment for the credit account that has the shortest computed distance to the centroid P&L value.

Product attributes for each credit account in the population of credit accounts are then identified as shown in step 910. Product attributes may include, for example, the APR, interest rate, promotional APR, credit line, annual fees, reward points, color of a credit card, brand of a credit card, grace period for delinquent repayment, repayment terms, fixed/variable interest rate, etc. The attribute data may be obtained from the cycle NIACC tables as well as other data sources.

Once the crisp profit driver segment and product attributes for each credit account are identified, the credit accounts may be grouped based, at least in part, on similar crisp profit driver segments and credit product attributes as shown in step 920. For example, similar customer behaviors within similar credit product groups are grouped together.

In step 930 the grouped credit accounts are monitored to track the migration of the groups between profit driver segments upon the happening of an account management action. By way of example, if the credit account management decided to lower the finance change for the group know as moderate revolvers, some credit accounts in the group may, based on the credit account's activity, may become heavy revolvers. This historical data can be quantified for each profit driver segment for each type of credit account management action. Once the behavior is quantified using historical results of these account management actions, the numerical values can be used to predict future credit account migration patterns.

One example of how the numerical values can be used to predict behavior patters is by organizing the numerical values into a matrix, called a transition matrix, as previously described in FIG. 3. The transition matrix captures the probabilities associated with various customer migration patterns for each defined account management action from one period to the next. The columns of the transition matrix define the profit driver segments and the rows of the transition matrix define the probability of the population of credit accounts migrating to the profit driver segment for a given period.

A user determines the product attributes to associate with each transition matrix (e.g., by APR range, by age of account, etc.). These associations may be stored as rules in a rules table. For each set of product attributes defined, the user creates a transition matrix that capture the probabilities associated with an account's migration pattern. Once sets of accounts have been defined, the transition matrices are matched such that only accounts that have the appropriate product attributes will be evaluated. Thus, the transition matrix tracks the migration between consecutive periods of customers who are grouped by similar behavior and products for all available pairs of consecutive periods.

Turning again to FIG. 6, once the probability of credit account migration is determined, the credit account is valued as shown in step 630. Valuation of the credit account may be based, at least in part, upon the characterization of the credit account and the determined probability of migration. The valuation or forecasted value of the one or more profit and loss components of the credit account is similarly based upon the characterization of the credit account and the determine probability of migration.

One way in which the credit account can be valued comprises calculating the net present value for the account, based on the cash flow for each evaluated period. The net present value is calculated by first calculating a "next period" cash flow for each of a plurality of periods into the future, and discounting the "next period" cash flow for those periods to the present. The lifetime-value of the account may be defined as the current value plus the sum of the net present values for each future period, i.e. the expected net present value of each migration path multiplied by the probability associated with that path.

Figure 10:
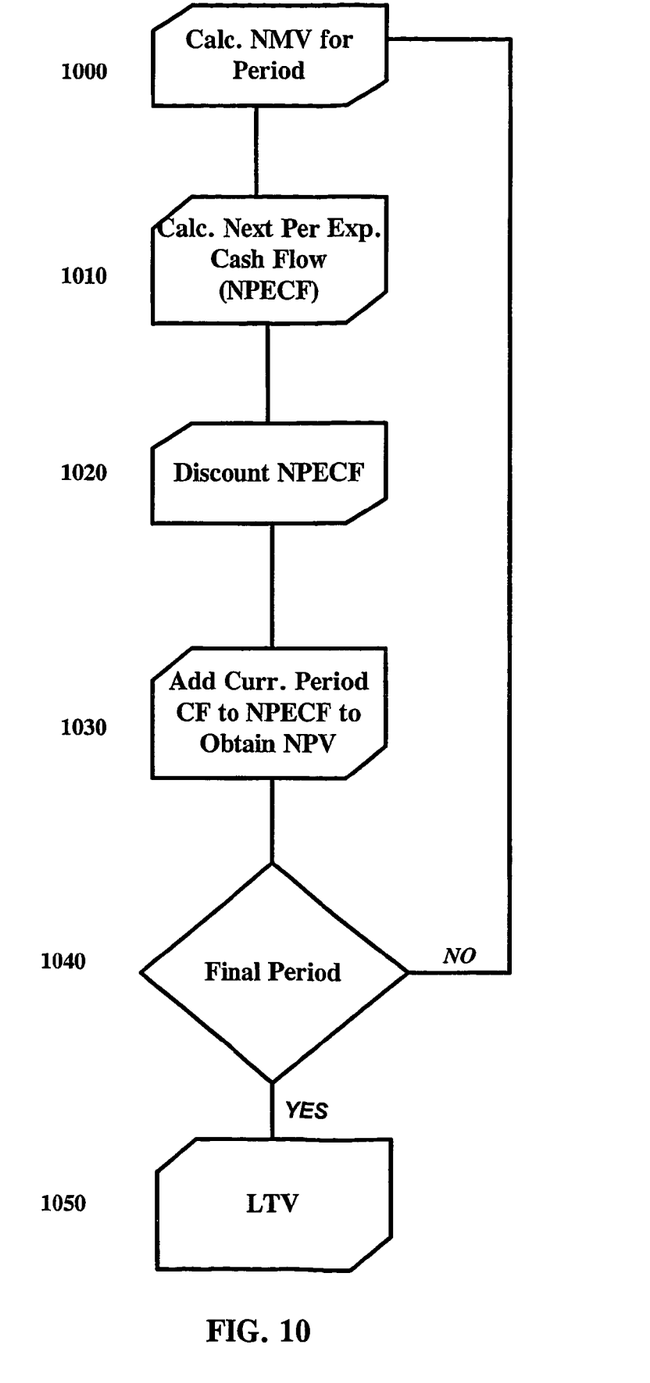
FIG. 10 is a block diagram illustrating the steps to calculate a net present value for a given period according to one embodiment of the present invention.

A block diagram illustrating the steps to calculate a lifetime-value for a credit account is shown in FIG. 10. Steps 1000 through 1030 depict the steps to calculate the credit account's net present value for a given period. The net present value for a given period is then used as the current period cash flow for the next subsequent period, and the net present value for multiple periods is calculated by iterating the step 1000 through 1030.

The next period cash flow is determined by first calculating a new membership vector (NMV) for the next period, for each account as shown in step 1000. This calculation is performed by first multiplying the initial membership vector (IMV) for the period describing the credit account by the transition matrix that best describes the desired product attributes to obtain a new membership vector.

Once the new membership vector for the next period is calculated, it is multiplied by the average cash flow for each profit driver segment to obtain a next period expected cash flow as shown in step 1010.

In one embodiment of the invention the average cash flow is in the form of a cash flow vector that describes the average cash flow for each profit driver segment. The cash flow vector is obtained by first organizing a population of credit accounts into groups based on similarities in product driver segments and credit product attributes. A cash flow for each profit driver segment in each of the credit accounts in the group is determined, and the average cash flow for each profit driver segment is calculated. Once the average cash flow for each profit driver segment is obtained, they are organized into a vector where the row of the vector describes the average cash flow for each of the profit driver segments.

The future period cash flow is then discounted to derive a net present value figure at step 1020. In one embodiment of the invention, discounting the next period expected cash flow comprises dividing the calculated next period expected cash flow by the sum of one (1) plus the hurdle or discount rate (in decimal format). For example, if the discount rate was 10% (percent) or 0.10, calculation of the discounted future period cash flow would comprise dividing the next period expected cash flow by 1.1.

The net present value at the end of one period is then the sum of the current period cash flow and the discounted future period cash flow as shown in step 1030.

The net present value for multiple periods is calculated by iterating steps 1000-1030 for each future period to be calculated as part of the lifetime-value. In these iterative steps, the net present value for the previous period is used as the current period cash flow when calculating the net present value for the current period. Accordingly, a determination is then made in step 1040 as to whether the final desired period has been reached. This determination may be based on, for example, user input, as when the credit account management desires to predict account values at a finite point in the future, or by operation of a set of rules, such as when an account's net present value after a period is zero, or below a threshold level.

If the answer to the query in step 1040 is in the negative, the process is repeated for the next period starting at step 1000. If, in the alternative, the answer to the query in step 1030 is in the affirmative, the calculated net present value for final period becomes the lifetime-value of the account as shown in step 1040.

It will be immediately apparent to those skilled in the art that variations and modifications to the disclosed embodiment are possible without departing from the spirit and scope of the present invention. The invention is defined by the appended claims.

We claim:

1. A method for valuing a credit account based upon a probability that the credit account will migrate between profit driver segments, the method comprising the steps of:
   a. establishing a plurality of profit driver segments, wherein the plurality of profit driver segments are determined by using a behavioral segmentation scheme wherein a plurality of accounts are grouped into clusters of similar behavior patterns based on individual profit and losses for each of the plurality of accounts;
   b. characterizing the credit account based upon its historical behavior to determine a degree of belonging of the credit account to each of the plurality of profit driver segments;
   c. determining a probability of migration of the credit account from at least one profit driver segment to at least one other profit driver segment based upon historical behavior data; and
   d. valuing the credit account based upon the characterization of the credit account and the determined probability of migration, wherein said establishing, characterizing, determining and valuing steps are performed on at least one machine, said at least one machine comprising at least one physical computing device.

2. The method of claim 1 wherein the step of establishing a plurality of profit driver segments comprises the step of analyzing historical credit account behavior data for a population of credit accounts to determine a plurality of profit driver segments that drive profitability.

3. The method of claim 2 wherein the step of analyzing historical credit account behavior data for the population of credit accounts comprises the steps of:
 a. translating historical credit account behavior into profit and loss terms;
 b. identifying a set of one or more profit and loss terms that are effective in characterizing the credit account behavior and profitability;
 c. applying standard rates to the set of one or more profit and loss terms to isolate the credit account behavior from pricing impact.

4. The method of claim 1 wherein the step of characterizing the credit account based upon its historical behavior comprises comparing profit and loss data for the credit account to average profit and loss data for a population of credit accounts.

5. The method of claim 4 wherein the step of comparing profit and loss data comprises the steps of:
 a. determining the profit and loss cash flow values for each of the profit driver segments characterizing the credit account;
 b. determining the average profit and loss cash flow value for each of the profit driver segments characterizing the population of credit accounts;
 c. comparing the profit and loss cash flow values and the average profit and loss cash flow values for each of the profit driver segments characterizing the credit account; and
 d. calculating a distance between each of the profit and loss cash flow values and average profit and loss cash flow values for each of the profit driver segments characterizing the credit account.

6. The method of claim 5 wherein the step of calculating the distance comprises taking a function of the distance between each of the profit and loss cash flow values and the average profit and loss cash flow values for each of the profit driver segments characterizing the credit account and scaling to one.

7. The method of claim 5 wherein the distance is calculated as the square root of the sum of the squares of the difference between each of the profit and loss cash flow values and the average profit and loss cash flow values for each of the profit driver segments characterizing the credit account.

8. The method of claim 1 wherein the step of determining the probability of migration of the credit account comprises analyzing the migration of a population of credit accounts between profit driver segments upon the happening of an account management action.

9. The method of claim 8 wherein the step of analyzing the migration comprises the steps of:
 a. identify a crisp profit driver segment for each credit account in the population of credit accounts;
 b. identify one or more product attributes for each credit account in the population of credit accounts;
 c. grouping the credit accounts in the population of credit accounts based, at least in part, on similar crisp profit driver segments and credit product attributes; and
 d. tracking the migration for one or more groups of credit accounts between profit driver segments from one period to the next upon the happening of an account management action.

10. The method of claim 1 wherein valuing the credit account comprises calculating the credit account's net present value for a period based at least in part on a current period cash flow for the credit account.

11. The method of claim 10 wherein the step of calculating the net present value of the credit account for a period comprises the steps of:
 a. calculating a next period cash flow for the period;
 b. discounting the next period cash flow; and
 c. summing the next period cash flow and current period cash flow.

12. The method of claim 11 wherein the step of calculating the next period cash flow comprises the steps of:
 a. creating an initial membership vector from the degree of belonging of the credit account to each of the plurality of profit driver segments;
 b. creating a transition matrix based on the probability of migration of the credit account from at least one profit driver segment to at least one other profit driver segment;
 c. multiplying the initial membership vector by the transition matrix to obtain a new membership vector; and
 d. multiplying the new membership vector by a cash flow vector to obtain a next period expected cash flow.

13. The method of claim 12 wherein the step of creating the initial membership vector comprises the steps of:
 a. determining a numerical value for the degree of belonging of the credit account to each of the plurality of profit driver segments; and
 b. organizing the numerical values into a vector where the row of the vector numerically describes the belongingness to each of the plurality of profit driver segments.

14. The method of claim 12 wherein the step of creating the transition matrix comprises the steps of:
 a. defining one or more product attributes to associate with the transition matrix;
 b. selecting a population of credit accounts to incorporate into the transition matrix based on at least the product attributes;
 c. determining a numerical value for the probability of migration for the population of credit accounts from at least one profit driver segment to at least one other profit driver segment for a given period; and
 d. organizing the numerical values into the transition matrix such that the columns of the transition matrix define the profit driver segments and the rows of the transition matrix define the probability of the population of credit accounts migrating to the profit driver segment for the given period.

15. The method of claim 12 further comprising the steps of:
 a. organizing a population of credit accounts into groups based on similarities in product driver segments and credit product attributes;
 b. determining a cash flow for each of the profit driver segments for each of the credit accounts in the group of credit accounts;
 c. averaging the cash flows for each profit driver segment of each credit account in the group of credit accounts;
 d. organizing the average cash flows into a vector where the row of the vector describe the average cash flow for each of the profit driver segments, wherein said organizing a population, determining a cash flow, averaging the cash flows, and organizing the average cash flow steps are performed on the at least one machine.

16. A system for valuing a credit account based upon a probability that the credit account will migrate between profit driver segments, the system comprising:
   at least one machine comprising at least one physical computing device operatively connected to computer-readable media having computer-executable instructions comprising:
   a. an account characterization module, the account characterization module being capable of establishing a plurality of profit driver segments and characterizing the credit account to determine a degree of belonging to each of the profit driver segments, wherein the plurality of profit driver segments are determined by using a behavioral segmentation scheme wherein a plurality of accounts are grouped into clusters of similar behavior patterns based on individual profit and losses for each of the plurality of accounts;
   b. a transition matrix module operatively connected to the account characterization module, the transition matrix being capable of determining a probability of migration of the credit account from at least one profit driver segment to at least one other profit driver segment; and
   c. a net present value module operatively connected to the account characterization module and transition matrix module, the net present value module being capable of valuing the credit account based upon the characterization of the credit account and the determined probability of migration.

17. A method for valuing a profit and loss component of a credit account based upon a probability that the credit account will migrate between profit driver segments, the method comprising the steps of:
   a. establishing a plurality of profit driver segments, wherein the plurality of profit driver segments are determined by using a behavioral segmentation scheme wherein a plurality of accounts are grouped into clusters of similar behavior patterns based on individual profit and losses for each of the plurality of accounts and an unsupervised clustering technique;
   b. characterizing the credit account based upon its historical behavior to determine a degree of belonging of the credit account to each of the plurality of profit driver segments;
   c. determining a probability of migration of the credit account from at least one profit driver segment to at least one other profit driver segment based upon historical behavior data; and
   d. valuing the profit and loss component of the credit account based upon the characterization of the credit account and the determined probability of migration,
   wherein said establishing, characterizing, determining and valuing steps are performed on at least one machine, said at least one machine comprising at least one physical computing device.

18. A non-transitory computer-readable medium having computer-executable instructions for a method for valuing a credit account based upon a probability that the credit account will migrate between profit driver segments, the method comprising the steps of:
   a. establishing a plurality of profit driver segments, wherein the plurality of profit driver segments are determined by using a behavioral segmentation scheme wherein a plurality of accounts are grouped into clusters of similar behavior patterns based on individual profit and losses for each of the plurality of accounts and an unsupervised clustering technique;
   b. characterizing the credit account based upon its historical behavior to determine a degree of belonging of the credit account to each of the plurality of profit driver segments;
   c. determining a probability of migration of the credit account from at least one profit driver segment to at least one other profit driver segment based upon historical behavior data; and
   d. valuing the credit account based upon the characterization of the credit account and the determined probability of migration.

19. A non-transitory computer-readable medium having computer-executable instructions for a method for valuing a profit and loss component of a credit account based upon a probability that the credit account will migrate between profit driver segments, the method comprising the steps of:
   a. establishing a plurality of profit driver segments, wherein the plurality of profit driver segments are determined by using a behavioral segmentation scheme wherein a plurality of accounts are grouped into clusters of similar behavior patterns based on individual profit and losses for each of the plurality of accounts and an unsupervised clustering technique;
   b. characterizing the credit account based upon its historical behavior to determine a degree of belonging of the credit account to each of the plurality of profit driver segments;
   c. determining a probability of migration of the credit account from at least one profit driver segment to at least one other profit driver segment based upon historical behavior data; and
   d. valuing the profit and loss component of the credit account based upon the characterization of the credit account and the determined probability of migration.

20. A non-transitory computer-readable medium having computer-executable instructions for a method for valuing a credit account based upon a probability that the credit account will migrate between profit driver segments, the method comprising the steps of:
   a. establishing a plurality of profit driver segments, wherein the plurality of profit driver segments are determined by using a behavioral segmentation scheme wherein a plurality of accounts are grouped into clusters of similar behavior patterns based on individual P&Ls for each of the plurality of accounts and an unsupervised clustering technique;
   b. characterizing the credit account based upon its historical behavior to determine a degree of belonging of the credit account to each of the plurality of profit driver segments;
   c. determining a probability of migration of the credit account from at least one profit driver segment to at least one other profit driver segment based upon historical behavior data; and
   d. valuing the credit account based upon the characterization of the credit account and the determined probability of migration.

21. The computer-readable medium of claim 20 wherein the unsupervised clustering technique minimizes the variance in profitability within each segment, while maximizing the variance in profitability between the different segments.

* * * * *